(12) United States Patent
Dib et al.

(10) Patent No.: US 11,005,330 B2
(45) Date of Patent: May 11, 2021

(54) CLOSED ROTARY ELECTRIC MACHINE COMPRISING AN INTERNAL COOLING SYSTEM

(71) Applicants: IFP Energies nouvelles, Rueil-Malmaison (FR); MAVEL S.r.l., Pont Saint Martin (IT)

(72) Inventors: Wissam Dib, Suresnes (FR); Luca Favre, Valpelline (IT); Davide Bettoni, Settimo Vittone to Italy (IT)

(73) Assignees: IFP ENERGIES NOUVELLES, Rueil-Malmaison (FR); MAVEL S.R.L., Pont Saint Martin (IT)

( * ) Notice: Subject to any disclaimer, the term of this patent is extended or adjusted under 35 U.S.C. 154(b) by 51 days.

(21) Appl. No.: 16/341,663

(22) PCT Filed: Sep. 25, 2017

(86) PCT No.: PCT/EP2017/074237
§ 371 (c)(1),
(2) Date: Apr. 12, 2019

(87) PCT Pub. No.: WO2018/069030
PCT Pub. Date: Apr. 19, 2018

(65) Prior Publication Data
US 2019/0386537 A1    Dec. 19, 2019

(30) Foreign Application Priority Data

Oct. 14, 2016    (FR) ........................................ 1659996

(51) Int. Cl.
*H02K 9/19*    (2006.01)
*H02K 5/18*    (2006.01)
(Continued)

(52) U.S. Cl.
CPC ................. *H02K 5/18* (2013.01); *H02K 5/20* (2013.01); *H02K 7/083* (2013.01); *H02K 9/06* (2013.01); *H02K 9/18* (2013.01); *H02K 9/19* (2013.01)

(58) Field of Classification Search
CPC .. H02K 5/20; H02K 5/18; H02K 9/18; H02K 9/19
See application file for complete search history.

(56) References Cited

U.S. PATENT DOCUMENTS 2,185,740 A * 1/1940 Smith ...................... H02K 9/18
                                                            310/57
2,571,872 A   10/1951 Hayes
(Continued)

FOREIGN PATENT DOCUMENTS

CH         545552 A     1/1974
EP        2634896 A2    9/2013
(Continued)

OTHER PUBLICATIONS

International Search Report for PCT/EP2017/074237, dated Jan. 9, 2018; English translation submitted herewith (7 pgs.).

*Primary Examiner* — Dang D Le
(74) *Attorney, Agent, or Firm* — Fitch, Even, Tabin & Flannery LLP

(57) ABSTRACT

The invention relates to a closed rotary electrical machine incorporating a cooling system comprising two internal fans secured on the shaft of the rotor, at the two ends of the rotor. Each fan faces the inner face of a flange comprising fins orient the flow of air created by the internal fans and can capture the heat from operation of the machine. A casing which contains the rotor and the stator of the electrical machine is sealed by two flanges. The cooling system also
(Continued)

comprises external cooling for cooling the casing and flanges, comprising air or liquid.

10 Claims, 6 Drawing Sheets

(51) Int. Cl.
    *H02K 5/20*           (2006.01)
    *H02K 7/08*           (2006.01)
    *H02K 9/06*           (2006.01)
    *H02K 9/18*           (2006.01)

(56) References Cited

U.S. PATENT DOCUMENTS

| | | | |
|---|---|---|---|
| 3,610,975 A | 10/1971 | Onjanow | |
| 5,939,808 A * | 8/1999 | Adames | H02K 9/19 310/54 |
| 8,614,538 B2 * | 12/2013 | Bradfield | H02K 9/19 310/407 |
| 8,686,608 B2 * | 4/2014 | Lendenmann | H02K 1/325 310/61 |
| 2002/0089248 A1 * | 7/2002 | Gozdawa | H02K 1/278 310/112 |

FOREIGN PATENT DOCUMENTS

| | | |
|---|---|---|
| FR | 2056482 A5 | 5/1971 |
| FR | 2934432 A1 | 1/2010 |
| WO | 2015/150100 A1 | 10/2015 |

* cited by examiner

CLOSED ROTARY ELECTRIC MACHINE COMPRISING AN INTERNAL COOLING SYSTEM

CROSS REFERENCE TO RELATED APPLICATIONS

Reference is made to PCT/EP2017/074237 filed Sep. 25, 2017, and French Application No. 16/59.996 filed Oct. 14, 2016, which are incorporated herein by reference in their entirety.

BACKGROUND OF THE INVENTION

Field of the Invention

The present invention relates to the field of rotary electrical machines and in particular to the cooling of rotary electrical machines.

More particularly it relates to the cooling, particularly by air, of a synchronous reluctance rotary electrical machine.

Description of the Prior Art

A rotary electrical machine conventionally comprises a fixed part, i.e. the stator, and a part which is mobile in rotation, the rotor, arranged coaxially one in the other. The rotor is generally accommodated inside the stator, which supports electrical windings which generate a magnetic field making it possible to rotate the rotor. The rotor is typically formed by a body formed by a stack of plates, and is placed on a rotational shaft. These plates comprise receptacles for permanent magnets or coils forming magnetic poles on the periphery of the rotor. The magnets can be placed on the surface of the rotor, or can be completely integrated in the rotor.

The electrical machines become heated because of the electromagnetic losses (losses by Joule effect and iron losses), and mechanical losses. This heating detracts from their functioning and leads to deterioration of their performance. For example, if the magnets are not cooled, the magnetic flux is less intense, which leads to a loss of torque, and therefore to deterioration of the performance of the electrical machine. Irreversible demagnetization of the magnets may occur. The winding is also sensitive to temperature increases so that the higher the temperature of the winding, the more the electrical conductivity of the copper and the service life of the winding are reduced. When the resistance of the copper increases, there is also a loss of performance. The various electromagnetic components of a rotary electrical machine, as well as certain insulating materials used in the parts of the electrical machine, are thus sensitive to the heating which takes place during functioning, and their cooling is essential in order to dissipate the produced heat to maintain good performance of the machine, ensure repeatability of its performance, extended service life, and limited maintenance.

The requirement for high-performance cooling is therefore a major concern for the manufacturers and integrators of rotary electrical machines.

Different types of cooling exist, which are often adapted to the power of the machine, including systems for cooling by air, which generally have lower efficiency and are aggressive for the interior of the motor, systems for cooling by liquid, for example by water, which are used in particular when the losses are substantial, as in the case of electric traction motors, or by oil. Other systems for cooling by helium or liquid nitrogen can be used for the electrical machines of electric power plants.

Although cooling by air constitutes an economically advantageous solution, compared with the other cooling systems, it generally has lower efficiency and therefore is often confined to cooling of low-power electrical machines. This is the case for example in traction applications, where cooling by air is typically used for electrical motors with power lower than 20 kW. Above that power level, a system for cooling by liquid is often implemented.

In addition, cooling by air generally requires circulation of air between the exterior and the interior of the electrical machine, which adds to the limitation of its field of application, reserved for "open" electrical machines, which are not sealed.

Systems for cooling by air of "closed" (sealed) electrical machines are also known, which are limited to the cooling of the exterior part of the machine housing by forced convection of air by use of a fan integral with the shaft. In these systems, the heat which is generated at the rotor is transferred to the air of the air gap and to the stator, and the heat of the stator is discharged via the housing. However, systems of this type do not discharge satisfactorily the heat generated within the machine, in particular at the rotor, which makes them difficult to use, in particular for cooling of electrical machines with very rapid rotation. The efficiency of such systems for cooling of closed machines by air is therefore limited, and in this case also their use is reserved for low-power machines.

SUMMARY OF THE INVENTION

The present invention overcomes the disadvantages of the aforementioned prior art, and provides a high-performance cooling system for a closed rotary electrical machine, for the purpose of guaranteeing the performance and output required of the electrical machine.

In particular, the invention permits efficient cooling of the shaft, the rotor, and the heads of coils, as well as the housing of a rotary electrical machine which can have a high index of protection "IP" according to standard EN 60529, and typically an index of protection IP67.

The invention also provides a cooling system which consumes no electrical energy (passive system) or little electrical energy in order to function, and which limits the mechanical losses associated with the functioning of the system.

Thus, in order to achieve at least one of the aforementioned objectives, amongst others, the present invention includes a closed rotary electrical machine comprising:
  a stator arranged in a casing, the stator comprising coils;
  a rotor comprising a body which is secured on a rotational shaft, and is fitted to rotate in the stator, with the shaft rotating around an axis X;
  a pair of bearings which support a side which drives a load of the rotational shaft, and a side opposite the side which drives the load of the rotational shaft;
  a front flange arranged at a first end of the casing, and supporting the side which drives the load of the rotational shaft;
  a rear flange arranged at a second end of the casing opposite the first end, and supporting the side opposite the side which drives the load of the rotational shaft;
the front and rear flanges comprising a sealing in order to seal the casing in a sealed manner, and each comprising an inner face, an outer face, and a receptacle which is positioned in a middle part of the inner face in order to receive one of the bearings; and a cooling system comprising:

a pair of internal fans arranged inside the casing in order to create a flow of air inside the casing during the rotation of the rotor, each fan being secured on the rotational shaft between the body of the rotor and a bearing; and external cooling in order to cool the casing and the front and rear flanges;

the inner face of the flanges comprising fins provided on a peripheral part of the receptacle of the bearing in order to orient the flow of air and capture the heat of the flow of air.

Preferably, the fins of the inner face of the flanges are flat, and have a general form of a trapezium comprising bases orthogonal to the axis X of the rotational shaft, and a side opposite the receptacle which has a concavity.

According to a first embodiment of the invention, the external cooling comprises an external fan arranged opposite the outer face of the rear flange, and secured on the rotational shaft, in order to convey exterior air along the casing in the direction of the front flange.

According to this first embodiment, the casing can have an outer surface comprising a set of cooling fins which are elongate substantially according to an axis parallel to the axis X of the rotational shaft, and the rear flange can comprise a central part which is a crown which is connected to a cylindrical peripheral part, and at least one opening between the central part and the peripheral part of the rear flange, in order to direct the exterior air conveyed by the external fan into passages formed by the assembly of the cooling fins of the outer surface of the casing.

The machine can also comprise metal plates which are fitted on the casing, and surround the cooling fins, in order to keep the air in the vicinity of the outer surface of the casing and the cooling fins during its circulation along the casing.

Preferably, the front flange comprises a central part which is a crown which is connected to a cylindrical peripheral part, the peripheral part comprising fins which dissipate heat on its outer face, the fins which dissipate heat are elongate substantially according to an axis parallel to the axis X of the rotational shaft, and extend the passages formed by the cooling fins of the casing.

Preferably, the external fan comprises a wheel to drive the exterior air, the wheel is secured on the rotational shaft, and a protective plate comprising orifices for the intake of the exterior air with the plate being secured on the peripheral part of the rear flange.

According to this first embodiment, the electrical machine preferably has power of between 20 kW and 75 kW.

According to a second embodiment of the invention, the external cooling comprise a cooling liquid circuit comprising an intake for the cooling liquid, an outlet for the cooling liquid, and a network of ducts in contact with the casing, in which the cooling liquid circulates in order to cool the casing and the front and rear flanges.

Advantageously, the network of ducts is a winding pipe incorporated in the casing.

Preferably, the cooling liquid comprises water.

According to this second embodiment, the electrical machine preferably has power of between 20 kW and 180 kW.

The electrical machine according to the invention is preferably a synchronous reluctance electrical machine.

Other objects and advantages of the invention will become apparent from reading the following description of particular embodiments of the invention, given by way of non-limiting example, the description being provided with reference to the appended figures described hereinafter.

In the figures, the same references designate identical or analogous elements.

DESCRIPTION OF THE INVENTION

The invention is a closed rotary electrical machine incorporating a cooling system which comprises two internal fans securely fitted on the shaft of the rotor, at the two ends of the rotor which each face the inner face of a flange comprising fins which orient the flow of air created by the internal fans, and capture the heat.

Closed electrical machine means an electrical machine having the rotor and stator of enclosed in a sealed casing, which can also be designated by the term housing.

According to the invention, the casing, which contains the rotor and the stator of the electrical machine, is closed to be sealed by two flanges.

The cooling system also comprises external cooling mean for cooling the casing and the flanges, which can be provided by air or liquid.

Figures 1A, 1B:
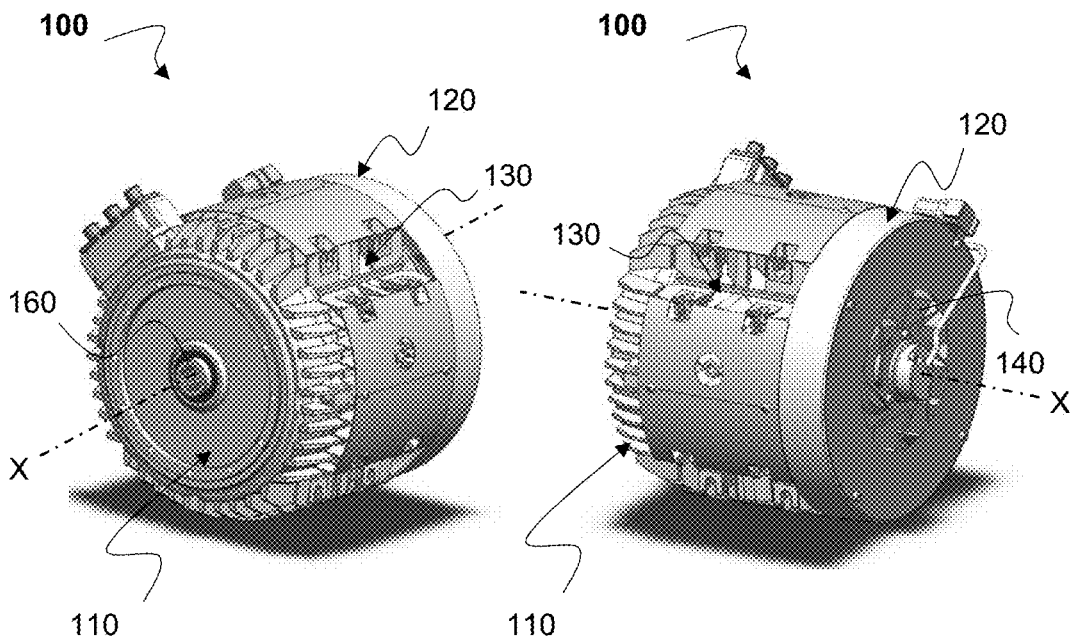
FIGS. 1A and 1B are perspective views, respectively of the front and the rear of the electrical machine according to a first embodiment of the invention in which the cooling of the machine is carried out entirely by air.

FIGS. 1A and 1B represent a closed electrical machine according to a first embodiment of the invention, which can be used as an electrical traction motor in an electrical or hybrid vehicle.

For example, a motor as represented in FIGS. 1A and 1B is a synchronous reluctance motor, also known as synchro-reluctant, with continuous power of 35 kW, and transitory (peak) power of 52 kW, and which can function with a DC bus supply voltage of 350 V.

Although it is advantageously applied to synchronous reluctance electrical machines, the present invention is not limited to this topology of electrical machine, and relates more extensively to any type of electrical machine, in particular electrical machines with power of between 20 kW and 180 kW. More specifically, the electrical machines according to the first embodiment can have power of between 20 and 75 kW, and the electrical machines according to the second embodiment described hereinafter can have power of between 20 kW and 180 kW.

The electrical motor 100 comprises a casing 130 which is closed in a sealed manner by a front flange 110 and a rear flange 120. The stator with its coils and the rotor of the electric motor are contained in the sealed casing 130. The interior of the casing 130 is represented better in FIG. 6, described in greater detail hereinafter in relation with the cooling system of the motor. A box with terminals (with no reference) in which the branching is carried out is secured on the casing 130, in particular at the flange 110 which closes the casing at the front of the motor. The casing 130 and the flanges 110 and 120 are made of metal, for example aluminium or iron.

According to the first embodiment of the invention, the external cooling comprises an external fan 140 arranged opposite the external face of the rear flange 120, and securely fitted on the rotational shaft 160 of the rotor, in order to convey exterior air along the casing 130 in the direction of the front flange 110.

The rotational shaft 160 which rotates around the axis X is supported by the front 110 and rear 120 flanges. The front flange 110, is arranged at a first end of the casing 130 and supports the side which drives the load of the rotational shaft 160, and the rear flange 120, which is arranged at a second end of the casing opposite the first end and supports the side opposite the side which drives the load of the rotational shaft 160.

In the remainder of the description, the front of the machine designates the side of the machine where a load is driven by the rotational shaft of the rotor, and rear of the machine designates the opposite side.

More specifically, the front 110 and rear 120 flanges each comprise an inner face 111, 121, an outer face 112, 122, and a receptacle 116a, 126a positioned in a middle part of the inner face 111, 121 in order to receive a bearing, as represented in FIGS. 2A, 2B, 3A, and 3B. The bearings 171 and 172 which can be seen in FIGS. 4A and 4B support the side which drives a load 160a of the rotational shaft 160 and the side opposite the side which drives the load 160b of the rotational shaft.

The front 110 and rear 120 flanges comprise sealings in order to close the casing 130 in a sealed manner.

Figures 2A, 2B:
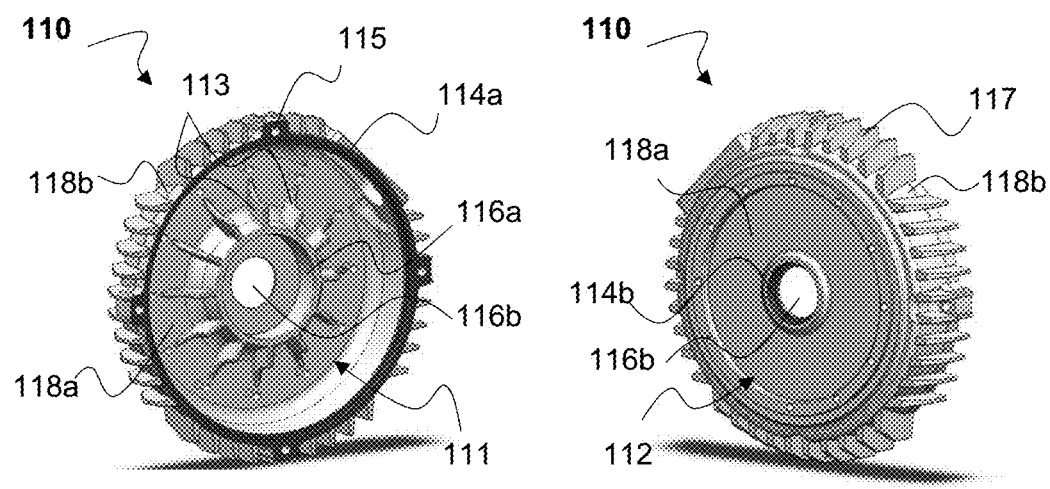
FIGS. 2A and 2B are perspective views respectively of the inner face and the outer face of the front flange of the electrical machine according to the first embodiment of the invention.

The front flange 110 is represented in FIGS. 2A and 2B, in particular its inner face 111 in FIG. 2A and its outer face 112 in FIG. 2B.

The front flange 110 comprises a central part in the form of a crown 118a, and a peripheral part with a cylindrical form 118b. The inner face 111, which faces towards the inside of the casing 130, comprises a receptacle 116a which is positioned in the median part of the inner face designed to receive the bearing 171. This receptacle 116a comprises in its center an orifice 116b which is designed for the passage of the rotational shaft 160 of the rotor. Seals 114b, 114a are provided at the orifice 116b for passage of the shaft 160 and on the perimeter of the peripheral part 118b which is designed to come into contact with the casing 130. The peripheral part 118b of the flange 110 also comprises securing points 115, for example four of them as illustrated, in order to secure the front flange 110 on the casing 130.

According to the invention, the inner face 111 of the front flange 110 comprises a series of fins 113 provided on the periphery of the receptacle 116a of the bearing. These fins serve orient the flow of air created by the rotation of an internal fan 181 placed between the bearing and the rotor 150, as described hereinafter in relation with FIGS. 4A, 4B and 6 which captures the heat of this flow of air. The inner face 111 of the front flange 110 comprises twelve fins 113 for example.

The fins 113 are preferably distributed regularly around the receptacle 116a. Preferably, the fins and the body of the flange are a single body (in a single piece), for example obtained during production by a mould. Advantageously, the fins contribute to circulation of the specific interior air which cools efficiently the coil heads and the rotary part of the machine. Each fin is preferably flat, and has the general form of a trapezium with bases which (parallel opposite sides) are orthogonal to the axis X, and the side that is opposite to the receptacle 116a which is curved, with a concavity (relative to a point situated on the periphery 118b of the flange in the radial extension of the fin). This concavity of the edge of the fin makes it possible to ensure optimum proximity to the coil heads, whilst optimizing airflow for efficient cooling. This description of the fins is provided on the basis of the parts which are on the surface of the flange (and not on the basis of a cross-section of the flange). According to a longitudinal cross-section which passes via the fin, the latter is a rectangular trapezium with the side of that forming a right angle with the bases constituting the wall of the receptacle 116 (shown in FIG. 6). The internal fins have to some extent the form of a bird's wing, having a scapular part opposite the inner face of the flange. The dimensions of the fins are such that a maximum space is left between the internal fan and the top part of the fins opposite the internal fan, to maintain proximity to the internal fan, which provides good circulation of the air in the free space left between the flange and the internal elements of the machine. By way of example which is not limiting, a space of 4 to 5 mm is between the internal fan and the top of the fins, for a device comprising flanges with an inner diameter of approximately 20 cm provided with internal fins approximately 20 mm long, the length of the fins (or also height) being understood as the dimension of the fins according to the axis X.

Figure 5:
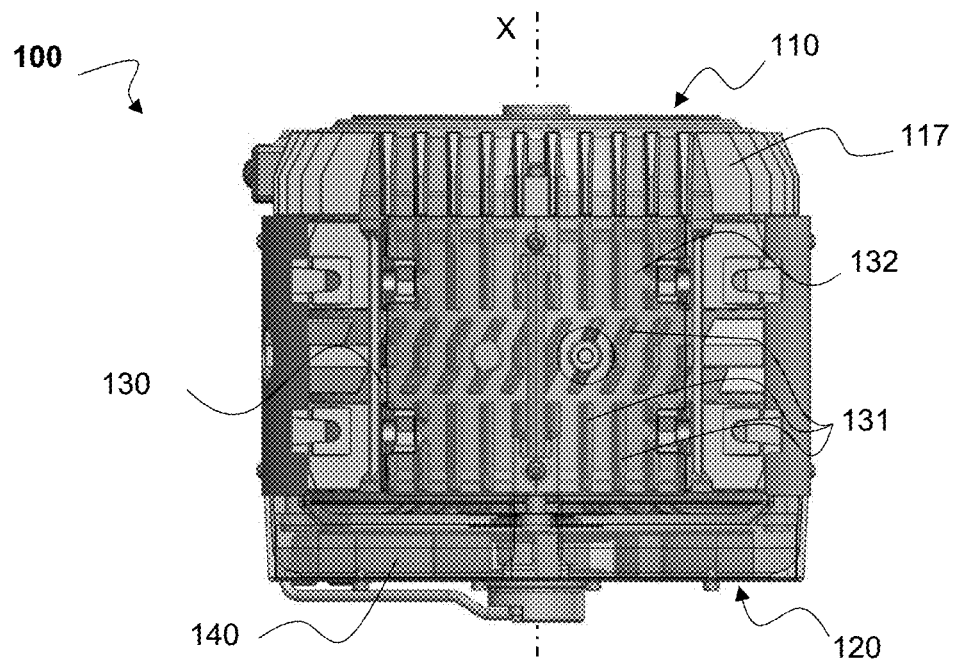
FIG. 5 is a top view from of the electrical machine according to the first embodiment of the invention.

Preferably, the peripheral part 118b of the front flange 110 additionally comprises fins 117 which dissipate heat on its outer face 112. The dissipation fins 117 are elongate substantially according to an axis parallel to the axis X of the rotor. When the casing 130 has an outer surface comprising a set of cooling fins 131 as shown in FIG. 5, the fins 117 of the front flange 110 extend the passages formed by the cooling fins 131 of the casing 130.

Figure 3A:
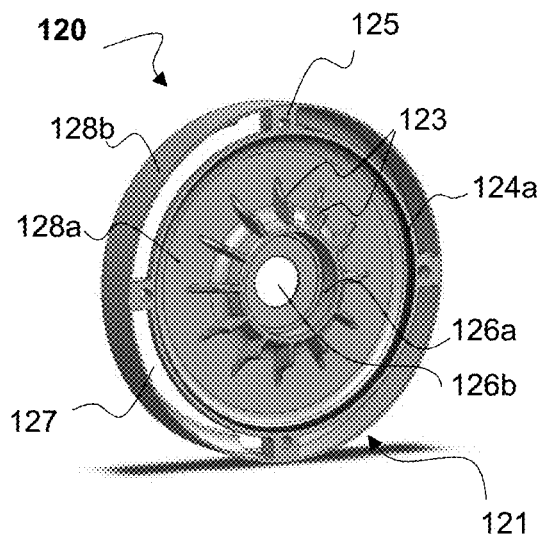
FIGS. 3A and 3B are perspective views respectively of the inner face and the outer face of the rear flange of the electrical machine according to the first embodiment of the invention.
Figure 3B:
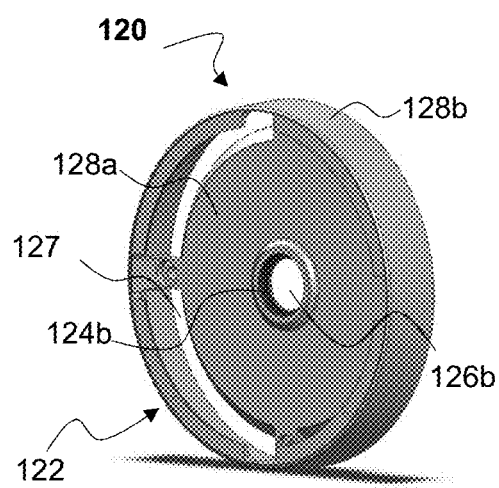

The rear flange 120, illustrated by its inner face 121 in FIG. 3A and by its outer face 122 in FIG. 3B, comprises a central part in the form of a crown 128a which is connected to a cylindrical peripheral part 128b. As for the front flange 110, the inner face 121 which faces towards the inside of the casing 130 comprises a receptacle 126a positioned in the middle part of the inner face which is designed to receive the bearing 172. In its center, this receptacle 126a comprises an orifice 126b which is designed for the passage of the rotational shaft 160 of the rotor. Seals 124b, 124a are provided at the orifice 126b for passage of the shaft 160, and on the perimeter of the central part 128b which is designed to come into contact with the casing 130. The peripheral part 128b and the central part 128a of the rear flange 120 comprise connections 125 which also comprise the points for securing of the flange on the casing. For example, the rear flange comprises four connections 125 with four securing points (orifices for passage of a screw for example).

According to the invention, in the same manner as for the front flange 110, the inner face 121 of the rear flange 120 comprises a set of fins 123, provided on the periphery of the receptacle 126a of the bearing. These fins 123 have the same function of orientation of the flow of air created by the rotation of an internal fan 182 placed between the bearing and the rotor 150, as described hereinafter in relation with FIGS. 4A, 4B and 6 for capturing the heat of this flow of air. The inner face 121 of the rear flange 120 comprises twelve fins 123 for example.

The fins 123 are preferably distributed regularly around the receptacle 126a. Their form and dimensions are preferably identical to those of the fins 113 of the inner surface 111 of the front flange 110 previously described.

The rear flange 120 comprises at least one opening 127 arranged between the central part 128a and the peripheral part 128b, in order to direct the exterior air conveyed by the external fan 140 along the casing 130, in particular in order to direct this air into passages formed by the set of cooling fins 131 of the outer surface of the casing 130. The rear flange 120 comprises for example four openings of this type, as illustrated in FIGS. 3A and 3B. These openings 207 are for example in the form of an arc of a circle, and are distributed regularly on the perimeter of the central part 128a of the flange 120.

FIG. 5 is a top view from above the motor according to the first embodiment of the invention, showing in greater detail the lateral part of the motor. The casing 130, which is typically made of metal, for example iron or aluminium, can have on its outer surface a series of cooling fins 131, which are elongate according to an axis substantially parallel to the axis of the rotor X. Substantially parallel to the axis X means more or less 25° relative to this axis X. These cooling fins 131 serve the purpose of increasing the exchange surface of the casing with the air for greater dissipation of the heat, and of directing the flow of air on the exterior of the surface of the casing, such as to cover all of the length of the casing from one flange to another. Continuity of passage of the flow of exterior air is created when the peripheral part of the front flange 110 also comprises dissipation fins 117, which are preferably oriented in the same direction as the cooling fins of the casing 130, thus improving the cooling of the casing and of the front flange.

In the description, exterior air is the air on the exterior of the rotary electrical machine which is closed, and interior air is the air contained in the closed electrical machine, more specifically the air which is contained in the sealed casing of the machine.

Advantageously, the electrical motor additionally comprises metal plates 132, which are preferably made of aluminium, fitted on the casing 130 and surround the cooling fins 131, in order to maintain the air in the vicinity of the outer surface of the casing 130 and of the cooling fins 131 during its circulation along the casing. In the example of the motor represented in FIG. 5, the metal plates 132 are slightly curved, to follow the form of the outer surface of the casing. In FIG. 5, the metal plates 132 are transparent, in order to show the structure which they surmount. The same applies to the rear flange 120 which is also transparent to also, show the external fan 140. The metal plates 132 are preferably distributed regularly around the casing. For example eight plates are secured on the casing, grouped in pairs in order to form a unit spaced around the casing.

The metal plates 132 are fitted on the casing to leave a passage for the circulation of the exterior air conveyed by the external fan 140. Thus, as can be seen clearly in FIG. 7A described hereinafter, the metal plates 132 can be supported on the peripheral part of the rear flange 120.

Figure 4A:
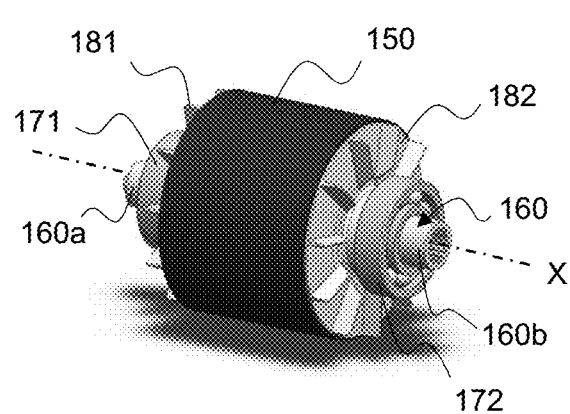
FIGS. 4A and 4B are a perspective view and a profile view of the rotary part of the electrical machine according to the invention, comprising two internal fans.
Figure 4B:
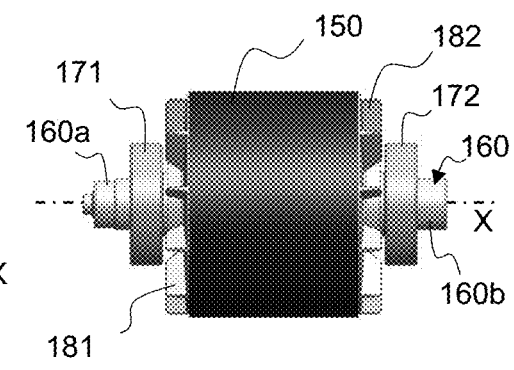

FIGS. 4A and 4B are perspective and profile views of the rotary part of the electrical machine, which, according to the invention, supports two internal fans 181 and 182. The rotor 150 is secured on the rotational shaft 160 which is supported by the bearings 171 and 172, which for example may be ball bearings, respectively on the side which drives the load 160a of the rotational shaft 160, and on the side opposite the side which drives the load 160b of the rotational shaft 160. The rotor 150 is fitted to be mobile in rotation in the stator 190 (not shown in FIGS. 4A and 4B). According to the invention, irrespective of the particular embodiment, a first fan 181 and a second fan 182 are securely fitted on the rotational shaft 160, on both sides of the rotor, between the body of the rotor and a bearing 171, 172. The first fan 181 is thus arranged on the front side of the motor, and faces the inner face 111 of the front flange 110 of the motor and the second fan 182 is arranged on the rear side of the motor, and faces the inner side 121 of the rear flange 120. This pair of internal fans 181, 182 is arranged inside the casing in order to create a flow of air inside the casing during the rotation of the rotor.

Figure 6:
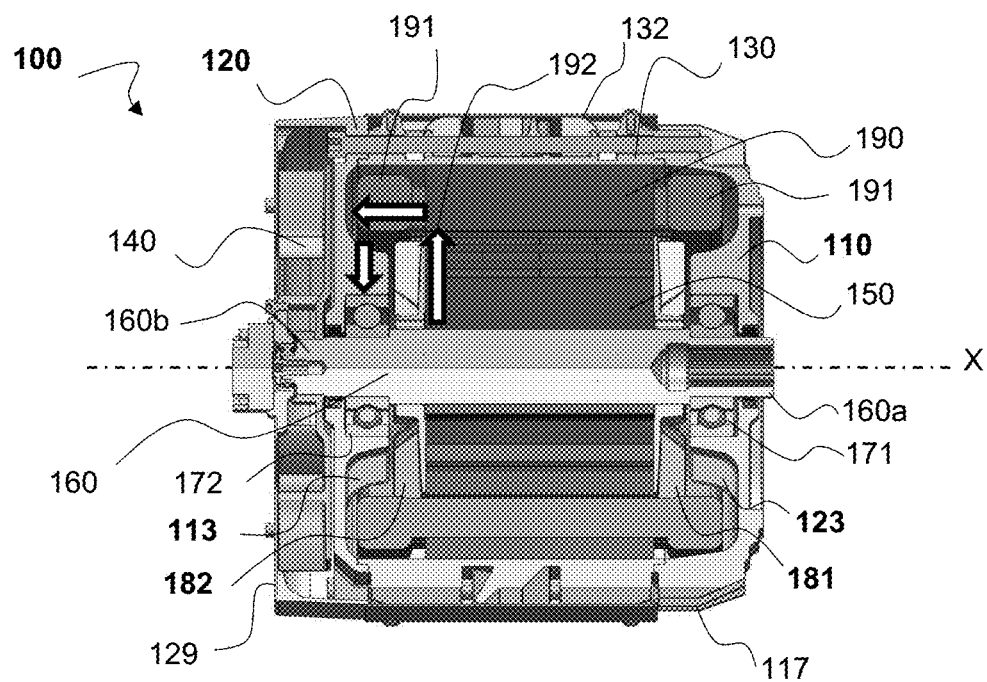
FIG. 6 is a longitudinal cross-sectional view of the electrical machine according to the first embodiment of the invention.

FIG. 6 is a cross sectional view of the motor 100 according to the first embodiment of the invention, showing the elements of the machine, and illustrating the circulation of the air inside the sealed casing (flow of air 192 represented by the arrows), caused by the interaction between the internal fans 181 and 182 and the structural elements of the machine within the casing 130, in particular the structure of the inner faces of the flanges 110 and 120.

The motor 100 comprises the stator 190, arranged in the casing 130, comprising coils, and in which the rotor 150 secured on the rotational shaft 160 to be rotatable. The cooling system of the motor comprises first the pair of internal fans 181 and 182, which interact with the fins of the flanges, and secondly external cooling, i.e. the external fan 140 according to the first embodiment, in order to cool the casing and the front and rear flanges.

During the rotation of the rotor, the internal fans 181 and 182 interact with the fins 113 and 123 of the inner faces 111 and 121 of the front and rear flanges 110, 120, to create an oriented internal flow of air so that the heat is captured from the fins of the inner faces of the flanges.

More specifically, the fins 113, 123 of the inner face 111, 121 of the front and rear flanges 110, 120 can direct the flow of air 192 created by each internal fan 181, 182 radially towards the heads 191 of the coils of the stator 190 (flow according to a direction which is centrifugal around the axis X of the rotational shaft 160), then return the flow of air from the heads 191 of the coils towards the center of the flange, firstly according to a direction parallel to the axis X, at the coil heads, then radially towards the rotational shaft (flow parallel to the axis X, then according to a centripetal direction around the axis X). Circulation of internal air of this type is thus carried out on the front side and the rear side of the motor, on both sides of the rotor 150. In addition to orienting the internal flow of air, the fins of the inner faces of the flanges 113 and 123 make it possible to dissipate the heat of the flow of air, and thus to cool the coil heads 191, as well as the shaft 160 and the rotor 150 of the electrical machine. The fan 140, positioned on the outer face of the rear flange 120, contributes towards the cooling of the casing 130 and the flanges by generation of an external flow of air, which is firstly directed radially towards the periphery of the outer face of the rear flange 120, and is then directed towards the front flange 110 parallel to the axis of rotation X, to border the outer surface of the casing 130 preferably provided with the cooling fins 131, and preferably surmounted by the metal plates 132, which confine the flow of air to the outer surface of the casing 130. The air thus preferably passes into the passages formed between the fins which are substantially elongate according to the axis X, while being confined to the space formed between the metal plates and the outer surface of the casing 130. Advantageously, the openings 127 in the rear flange 120 permit the passage of the exterior air conveyed by the fan 140 from the outer face of the flange to the exterior surface of the casing 130, preferably provided with the cooling fins 131.

Figure 7A:
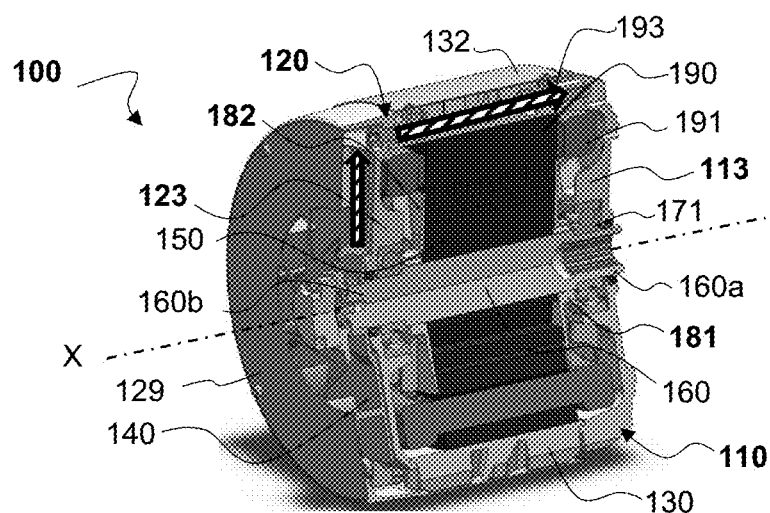
FIGS. 7A, 7B and 7C are perspective views with removal of the rear part (FIG. 7A) and the front part (FIG. 7B) of the electrical machine according to the first embodiment of the invention, as well as a view in longitudinal cross-section of the electrical machine illustrating the external flow of air generated by the external fan, and circulating on the exterior of the casing.
Figure 7B:
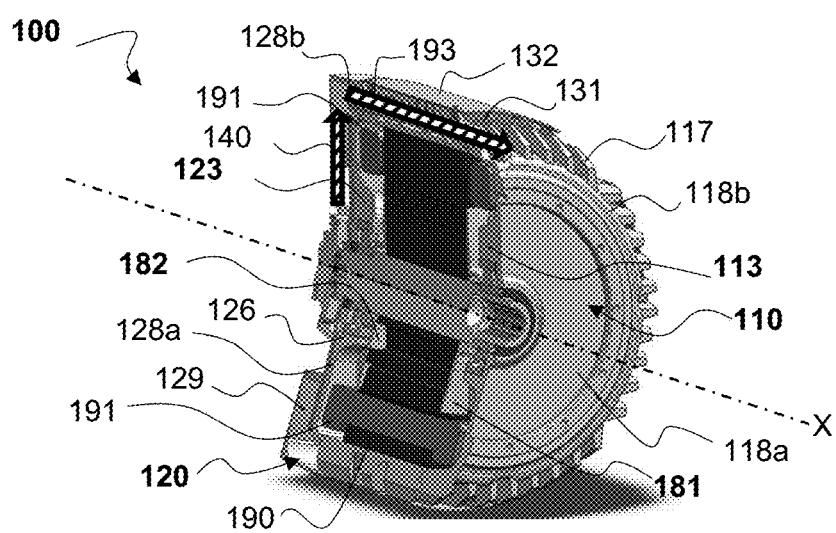
Figure 7C:
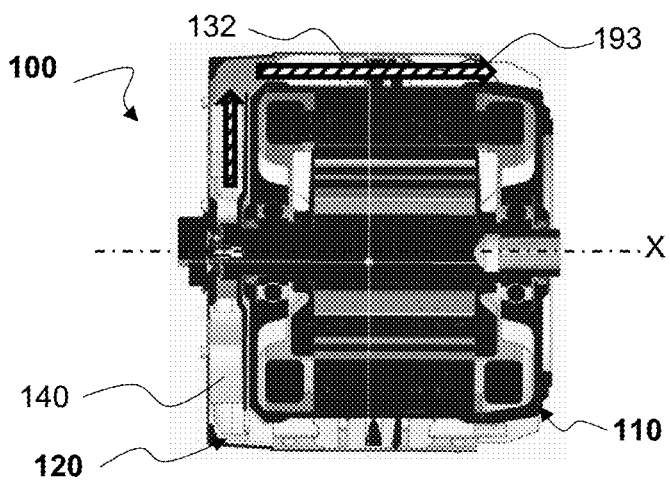

The exterior flow of air is represented by arrows 193 in FIGS. 7A, 7B and 7C, which show the motor according to the first embodiment, respectively according to a rear view, a front view and a longitudinal cross-section.

Figure 8A:
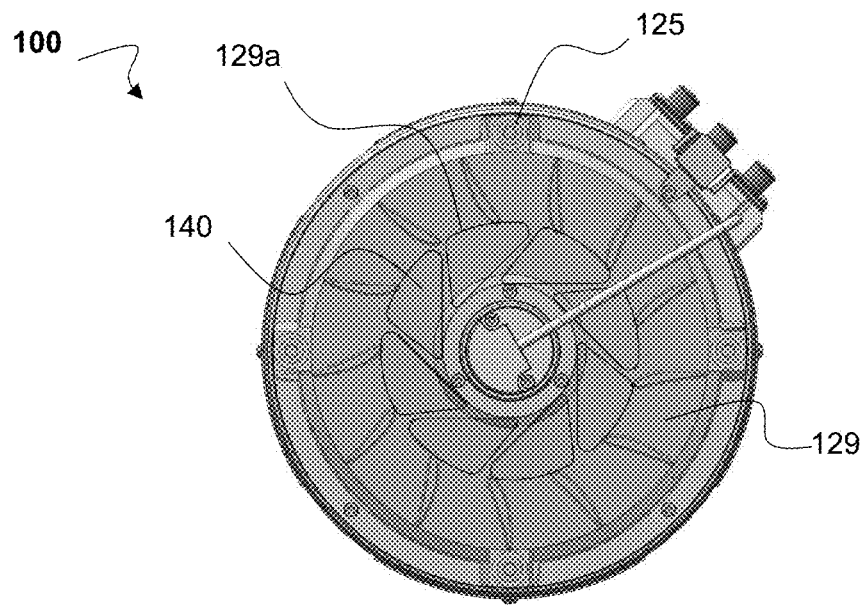
FIGS. 8A and 8B are respectively a plan view of the rear face of the electrical machine, and a perspective view of this same rear face, according to the first embodiment of the invention.
Figure 8B:
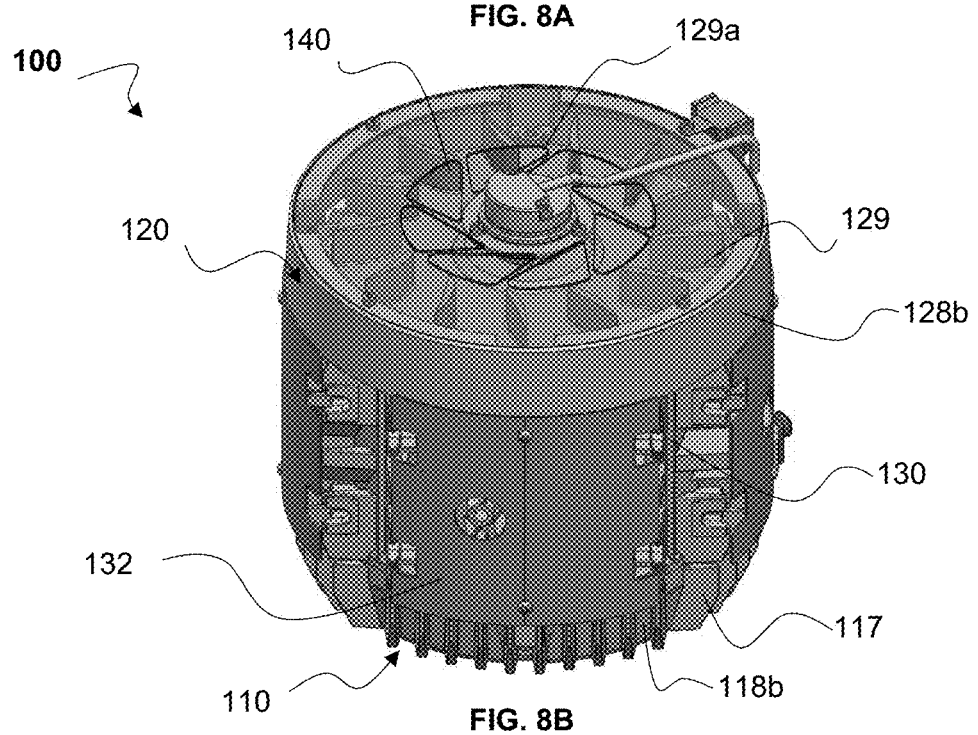

The external fan 140 comprises a wheel to drive the exterior air, which wheel is secured on the rotational shaft 160, and a protective plate 129 secured on the peripheral part 128*b* of the rear flange 120. The external fan 140 can be seen clearly in FIGS. 8A and 8B, which are respectively a plan view of the rear face and a view in perspective of this same rear face of the motor according to the first embodiment. The protective plate 129 comprises orifices 129*a* for the intake of the exterior air which is aspirated by the drive wheel of the fan 140. The external fan 140 has dimensions larger than that of the internal fans 181 and 182. The dimension of the fan 140 is selected according to the power of the motor and the maximum speed of rotation, such as to ensure optimum cooling.

Figure 9A:
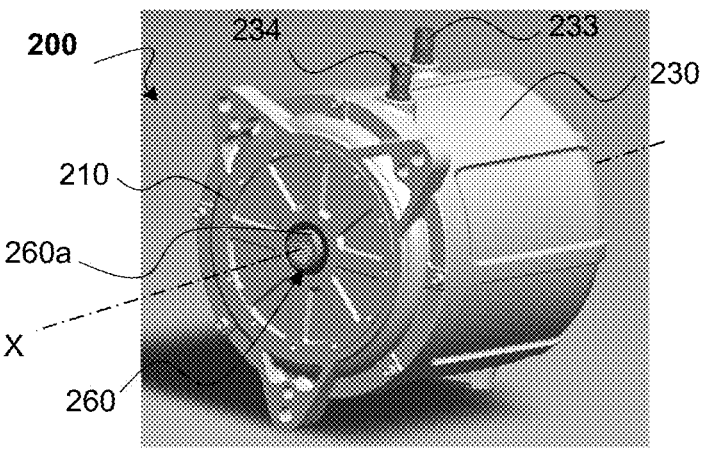
FIGS. 9A and 9B are perspective views, respectively of the front and the rear, of the electrical machine according to a second embodiment of the invention in which the machine is cooled by air and by liquid.
Figure 9B:
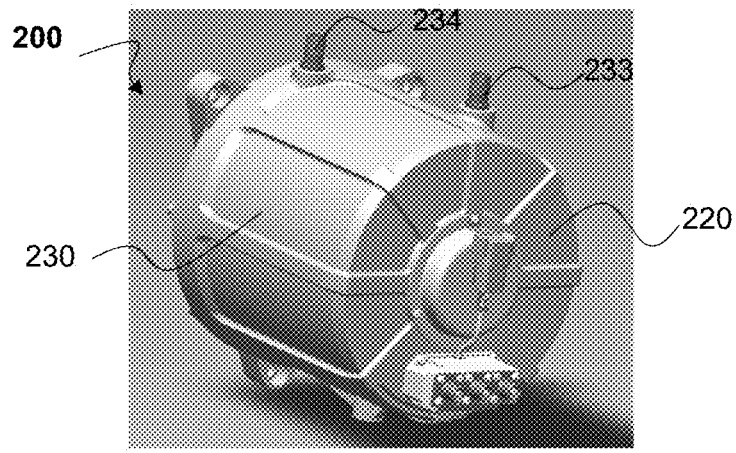
Figure 9C:
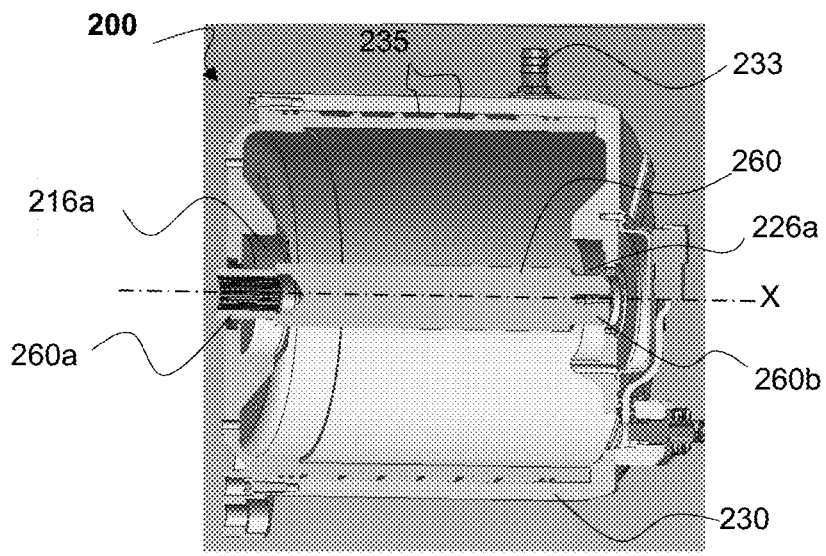
FIG. 9C is a view of the electrical machine according to the second embodiment of the invention.

According to a second embodiment illustrated in FIGS. 9A, 9B and 9C, the machine according to the invention comprises a device for cooling the casing of the motor by liquid.

In a manner similar to the motor according to the first embodiment of the invention, the motor 200 comprises:
- a stator arranged in a casing 230, the stator comprising coils;
- a rotor comprising a body which is secured on a rotational shaft 260, and is fitted to rotate in the stator;
- a pair of bearings which support a side which drives a load 260*a* of the rotational shaft 260, and a side opposite the side which drives the load 260*b* of the rotational shaft 260;
- a front flange 210 arranged at a first end of the casing 230, and supporting the side which drives the load 260*a* of the rotational shaft 260;
- a rear flange 220 arranged at a second end of the casing 230 opposite the first end, and supporting the side opposite the side which drives the load 260*b* of the rotational shaft 260; the front and rear flanges comprising sealing means in order to close the casing 230 in a sealed manner, and each comprising an inner face, an outer face, and a receptacle 216*a*, 226*a* which is positioned in a median part of the inner face in order to receive one of the said bearings; and
- a cooling system comprising a pair of internal fans arranged inside the casing in order to create a flow of air inside the casing during the rotation of the rotor, each fan being fitted secured on the rotational shaft between the body of the rotor and a bearing;

the inner face of the flanges comprising fins provided on a peripheral part of the receptacle of the bearing in order to orient the flow of air and capture the heat of the said flow of air.

According to this second embodiment, the cooling of the inside of the machine is identical to that described in relation with the first embodiment, that is a pair of internal fans in interacting with the fins of the inner faces of the front and rear flanges, as previously described in the description.

According to this second embodiment, the external cooling means in order to cool the casing and the front and rear flanges comprise a cooling liquid circuit. This circuit comprises an intake 233 for the cooling liquid, an outlet 234 for the cooling liquid, and a network of ducts 235 in contact with the casing 230, in which a cooling liquid, such as water, or any other liquid which can cool the machine, circulates in order to cool the casing 230 and the front 210 and rear 220 flanges.

Advantageously, the network of ducts is a winding pipe integrated in the casing 230, as can be seen in FIG. 9C, in which the openings 235 correspond to the winding pipe according to a longitudinal cross-section of the motor.

In the example of the motor 200 represented in FIGS. 9A, 9B and 9C, the motor is closed, i.e. the motor comprises a sealed case formed by the casing 230 and the front 210 and rear 220 flanges. The flanges close the casing in a sealed manner. More specifically, the front flange 210 and a part of the casing 230 are in a single piece, and the rear flange 220 and a part of the casing 230 form a second single piece, the joining of the two pieces forming the sealed case, and making possible the integration of the winding pipe in the casing 230.

The liquid cooling circuit makes it possible to cool the entire casing 230 of the motor 200, including the flanges 210 and 220, by exchange of heat between these elements and the cooling liquid.

The present invention advantageously applies to synchronous reluctance motors, and preferably to machines with power of between 20 kW and 180 kW. By way of non-limiting example, the cooled motor according to the invention can be a synchronous reluctance motor with continuous power of 30 kW, transitory (peak) power of 52 kW, which can function with a DC bus supply voltage of 350 V, and can have the following dimensions: outer diameter of the rotor 134 mm, outer diameter of the stator 200 mm, outer diameter of the casing 250 mm, length of the motor 214 mm, length of the active part (corresponding to the length of the stack of plates of the rotor) 100 mm.

The invention claimed is:

1. A closed rotary electrical machine comprising:
   a stator in a casing comprising coils;
   a rotor comprising a body which is secured to a rotational shaft, and is rotatable in the stator, with the shaft rotating around an axis;
   a pair of bearings which support a first side which drives a load of the rotational shaft, and a second side opposite the first side which drives the load of the rotational shaft;
   a front flange located at a first end of the casing, and supporting the first side which drives the load of the rotational shaft;

a rear flange located at a second end of the casing opposite the first end which supports the first side opposite the second side and which drives the load of the rotational shaft;

the front and rear flanges comprising seals closing the casing, and each flange comprising an inner face, an outer face, and a receptacle which is positioned in a middle part of the inner face in order to receive one of the bearings;

a cooling system including a pair of internal fans located inside the casing which create a flow of air inside the casing during the rotation of the rotor, each fan being secured on the rotational shaft between the body of the rotor and one of the bearings;

an external cooler for cooling the casing and the front and the rear flanges;

the inner face of the flanges comprising fins on a peripheral part of a receptacle for one of the bearings and which orients flow of air to capture heat from operation of the machine;

the external cooler comprises an external fan located opposite the outer face of the rear flange and which is secured on the rotational shaft for conveying exterior air along the casing in a direction toward the front flange;

the casing includes an outer surface comprising cooling fins which are elongated relative to an axis parallel to the axis of the rotational shaft;

the rear flange comprises a central crown which is connected to a cylindrical peripheral part and at least one opening between the central crown and the cylindrical peripheral part of the rear flange for directing the external air conveyed by the external fan into passages of an assembly of the cooling fins on the outer surface of the casing;

metal plates on the casing which surround the cooling fins to maintain air proximate the outer surface of the casing and the cooling fins during circulation along the casing; and the front flange comprises a central crown connected to a cylindrical peripheral part, the peripheral part comprises fins which dissipate heat on an outer face of the peripheral part and are elongated relative to an axis parallel to the axis of the rotational shaft and which extend the passages formed by the cooling fins of the casing.

2. The electrical machine according to claim 1, wherein the fins of the inner face of the flanges are flat and comprise a trapezium including bases orthogonal to the axis of the rotational shaft, and a concave side opposite the receptacle.

3. The electrical machine according to claim 2, wherein the external fan comprises a wheel which drives an exterior of the casing and which is secured on the rotational shaft, and a protective plate comprising orifices for intake of the exterior air, the plate being secured on a peripheral part of the rear flange.

4. The electrical machine according to claim 1, wherein the external fan comprises a wheel which drives an exterior of the casing and which is secured on the rotational shaft, and a protective plate comprising orifices for intake of the exterior air, the plate being secured on a peripheral part of the rear flange.

5. The electrical machine according to claim 1, wherein the machine has a power rating between 20 kW and 75 kW.

6. The electrical machine according to claim 1, wherein the external cooler comprises a cooling liquid circuit comprising an intake for cooling liquid, an outlet for the cooling liquid, and a network of ducts in contact with the casing, in which the cooling liquid circulates for cooling the casing and the front and rear flanges.

7. The electrical machine according to claim 6, wherein the network of ducts is a winding pipe incorporated in the casing.

8. The electrical machine according to claim 6, wherein the cooling liquid comprises water.

9. The electrical machine according to claim 6, wherein the machine has a power rating between 20 kW and 180 kW.

10. The electrical machine according to claim 1 comprising a synchronous reluctance electrical machine.

* * * * *